(12) United States Patent
Kuo

(10) Patent No.: US 7,446,538 B2
(45) Date of Patent: Nov. 4, 2008

(54) DEVICE FOR IDENTIFYING AC POWER SUPPLY ARRANGEMENT

(75) Inventor: Heng-Chen Kuo, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 285 days.

(21) Appl. No.: 11/309,725

(22) Filed: Sep. 15, 2006

(65) Prior Publication Data

US 2007/0223155 A1    Sep. 27, 2007

(51) Int. Cl.
*G01R 31/00* (2006.01)

(52) U.S. Cl. .................................. 324/508; 324/537

(58) Field of Classification Search .............. 324/537, 324/508

See application file for complete search history.

(56) References Cited

U.S. PATENT DOCUMENTS 6,462,555 B1 * 10/2002 Schaefer ..................... 324/508

* cited by examiner

*Primary Examiner*—Vincent Q Nguyen
(74) *Attorney, Agent, or Firm*—Wei Te Chung

(57) ABSTRACT

A device for identifying an arrangement of an AC power supply. The device includes first and second voltage detecting circuits and a comparison logic circuit. The first voltage detecting circuit, coupled to ground and hot lines of the AC power supply, receives a first input signal from the hot line and detects the voltage level thereof to generate a first detect signal. The second voltage detecting circuit, coupled to ground and neutral lines of the AC power supply, receives a second input signal from the neutral line and detects the voltage level thereof to generate a second detect signal. The comparison logic circuit, coupled to the first and second voltage detecting circuits, generates first and second identification signals according to the first and second detect signals, indicating the arrangement of the AC power supply.

20 Claims, 2 Drawing Sheets

DEVICE FOR IDENTIFYING AC POWER SUPPLY ARRANGEMENT

FIELD OF THE INVENTION

The present invention relates to power arrangement identification, and particularly to a device for identifying an arrangement of an alternating current (AC) power supply.

DESCRIPTION OF RELATED ART

Conventionally, power supplies for electronic equipment employ a three-wire AC configuration. Generally, a "hot line" and a "neutral line" of AC electric wiring are used to provide power, and a "ground line" thereof is connected to ground, protecting users from being electrocuted.

Among AC power supply systems, 110V and 220V power systems are widely used. The 110V AC power system is a single-phase two-wire-plus-ground (1φ2 W+G) system, wherein the voltage carried thereby is 110V with respect to the neutral line. The 220V AC power system includes two different type systems with respect to voltage generation thereof; one is single-phase two-wire-plus-ground (1φ2 W+G) system having a hot line carrying 220V voltage and the other is single-phase three-wire (1φ3 W), having a hot line (first hot line) and a neutral line (second hot line), each carrying 110V voltage. Different voltage, plug, and socket types are used around the world according to the standard defined by International Electrotechnical Commission (IEC) and National Electrical Manufacturers Association (NEMA). However, miswirings may occur when the wiring is installed improperly. One of the miswiring conditions is the swapping of the hot and neutral lines in the wall socket, that is, an inverted single-phase two-wire-plus-ground system. Another type of miswiring is socket misuse between 220V single-phase two-wire-plus-ground and single-phase three-wire systems. The swapping of the hot and neural lines may be an electrocution hazard for individuals with alternating currents flowing on the metal surface of electrical appliances or it may damage internal circuits of precision machines requiring precise power supply. Thus, a fuse is generally connected between the hot and neutral lines, whereby if the power source becomes abnormal, the fuse automatically protects the equipment. The use of fuses has advantages of simplicity and low cost; however, a fuse may mal-function failing to protect equipment. Moreover, replacement of fuses when required is time-consuming.

SUMMARY OF THE INVENTION

A device for identifying an arrangement of an AC power supply is provided. In a preferred embodiment, the device comprises a first voltage detecting circuit, a second voltage detecting circuit, and a comparison logic circuit. The first voltage detecting circuit, coupled to a ground line and a hot line of the AC power supply, receives a first input signal from the hot line of the AC power supply and detects the voltage level thereof to generate a first detect signal. The second voltage detecting circuit, coupled to a ground line and a neutral line of the AC power supply, receives a second input signal from the neutral line of the AC power supply and detects the voltage level thereof to generate a second detect signal. The comparison logic circuit, coupled to the first and second voltage detecting circuits, receives the first and second detect signals to generate first and second identification signals according to the first and second detect signals, indicating the arrangement of the AC power supply.

Another device for identifying an arrangement of an AC power supply is further provided. The device comprises a first detecting circuit, a second detecting circuit, and a comparison logic circuit. The first detecting circuit, coupled between a hot line and a ground line of the AC power supply, detects a voltage level therebetween to generate a first detect signal. The first detecting circuit comprises a first voltage divider, a first resistor-capacitor (RC) filter, and first level determination circuit. The first voltage divider, coupled between the hot and ground lines, receives a first input signal from the hot line and adjusts the voltage level thereof to generate a first divided signal. The first RC filter, coupled to the first voltage divider, receives and rectifies the first divided signal to generate a first rectified signal according to a direct current (DC) component thereof. The first level determination circuit, coupled to the first RC filter, generates the first detect signal in response to the first rectified signal. The second detecting circuit, coupled between a neutral line and the ground line of the AC power supply, detects a voltage level therebetween to generate a second detect signal. The second detecting circuit comprises a second voltage divider, a second RC filter, and a second level determination circuit. The second voltage divider, coupled between the neutral and ground lines, receives a second input signal from the neutral line and adjusts the voltage level thereof to generate a second divided signal. The second RC filter, coupled to the second voltage divider, receives and rectifies the second divided signal to generate a second rectified signal according to a DC component thereof. The second level determination circuit, coupled to the second RC filter, generates the second detect signal in response to the second rectified signal. The comparison logic circuit receives the first and second detect signals to generate first and second identification signals according to the first and second detect signals, indicating the arrangement of the AC power supply.

Other advantages and novel features will become more apparent from the following detailed description when taken in conjunction with the accompanying drawings, in which:

DETAILED DESCRIPTION OF THE INVENTION

Figure 1:
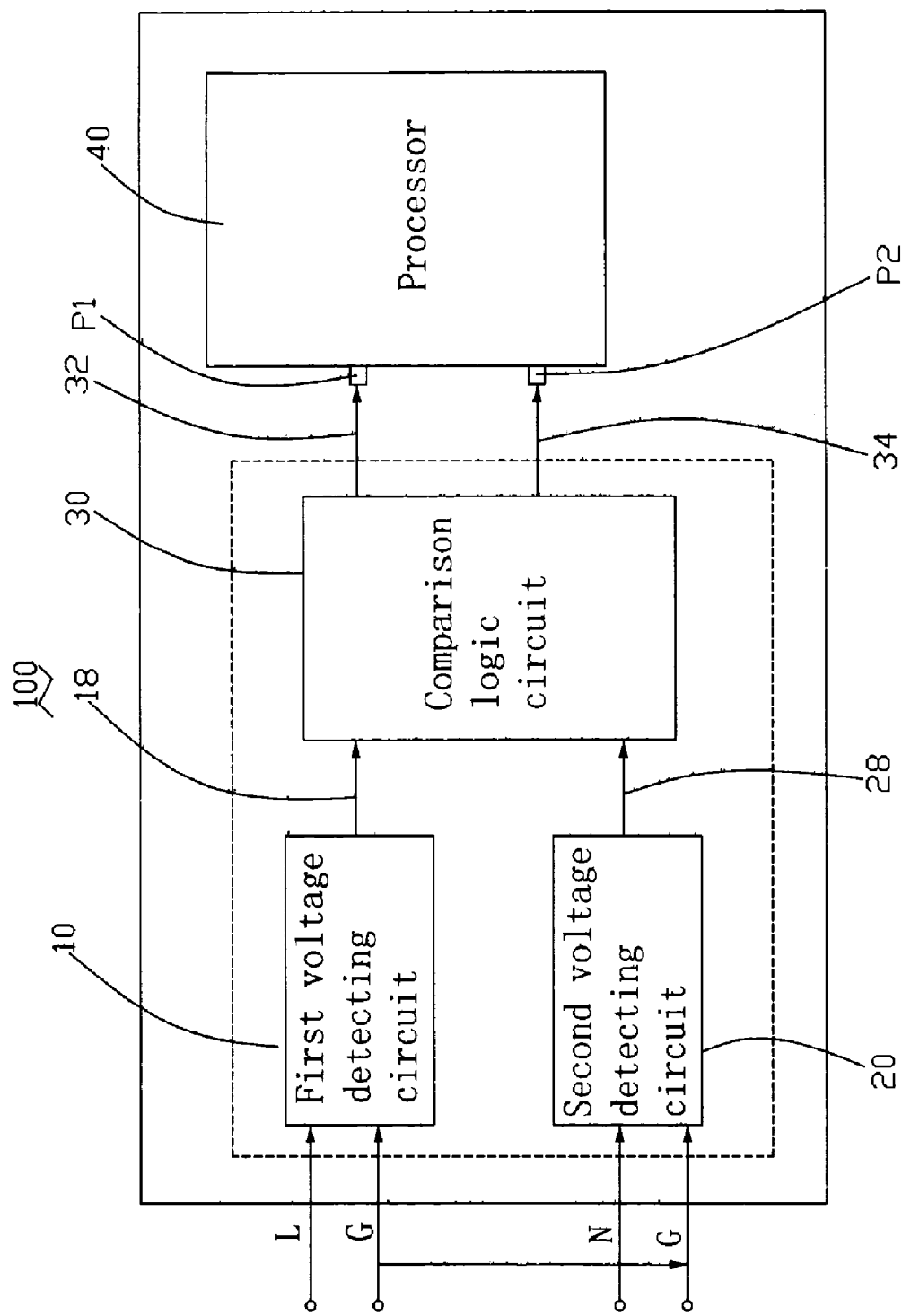
FIG. 1 is a block diagram of a device for identifying an arrangement of an AC power supply in accordance with a preferred embodiment of the invention.

FIG. 1 shows a device 100 for identifying an arrangement of an AC power supply according to an embodiment of the invention. The device 100 comprises voltage detecting circuits 10 and 20, a comparison logic circuit 30, and a processor 40. The voltage detecting circuit 10, coupled to a hot line L and a ground line G of the AC power supply (not shown), detects a voltage level therebetween and transmits a first detect signal 18 to the comparison logic circuit 30. The voltage detecting circuit 20, coupled to a neutral line N and the ground line G of the AC power supply (not shown), detects a voltage level therebetween and transmits a second detect signal 28 to the comparison logic circuit 30. The comparison logic circuit 30 receives the detect signals 18 and 28 and generates a first identification signal 32 and a second identification signal 34 according to the detect signals 18 and 28 to indicate the arrangement of the AC power supply. The processor 40 receives the identification signals 32 and 34 at terminals P1 and P2 respectively, determining the arrangement of the AC power supply accordingly. It is noted that, the lines L, N, and G of exemplary embodiments represent corresponding lines of 110V or 220V single-phase two-wire AC power supply while in a single-phase three-wire AC power supply, the lines L and N correspond to a first hot line and a second hot line thereof respectively.

Figure 2:
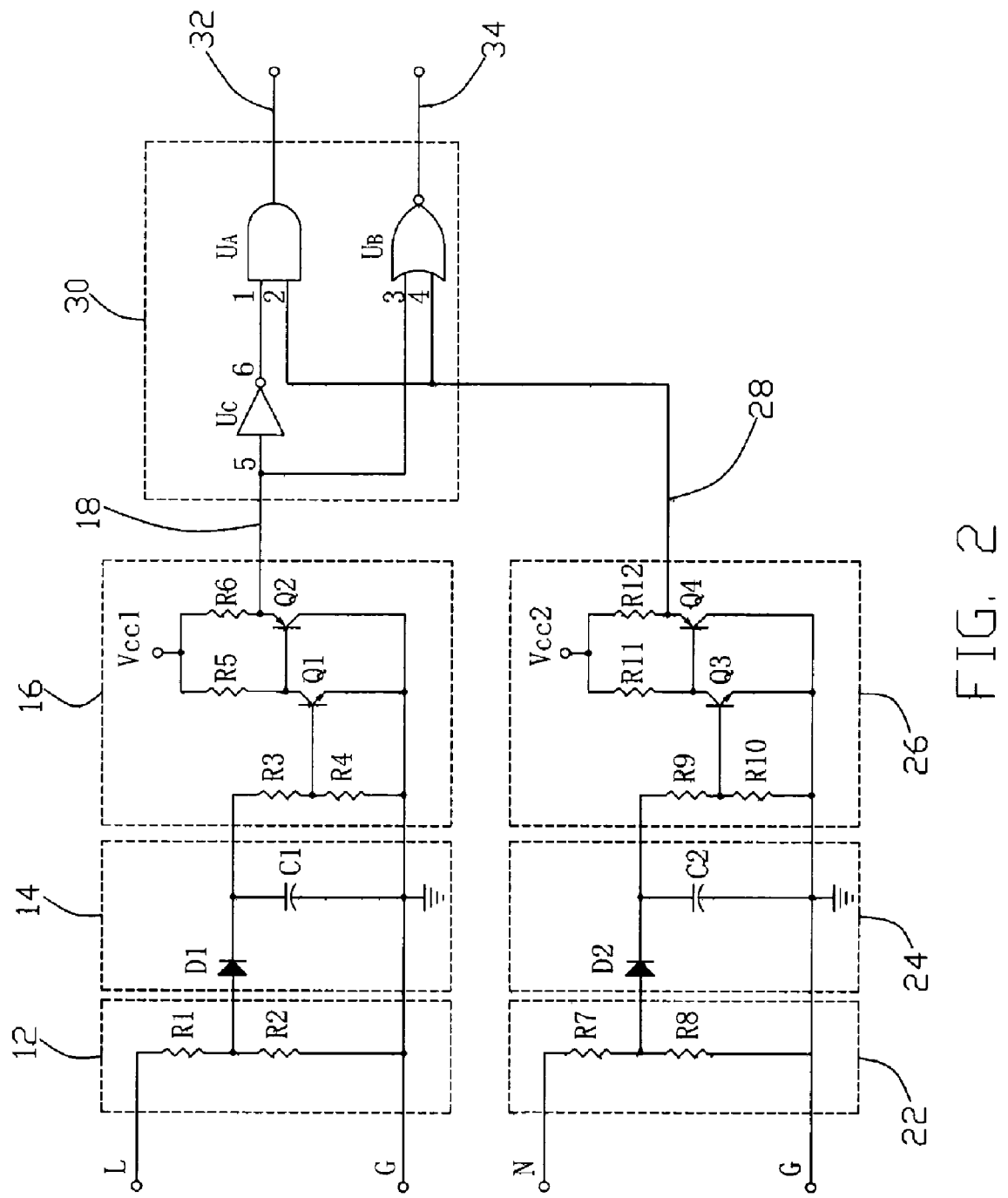
FIG. 2 is a circuit diagram of the device for identifying the arrangement of the AC power supply of FIG. 1.

FIG. 2 shows a detailed circuit diagram of the device 100. The voltage detecting circuit 10 comprises a voltage divider 12, a filter 14, and a level determination circuit 16. The voltage divider 12 comprises resistors R1 and R2 coupled in series between the hot line L and the ground line G to adjust the voltage level therebetween. Preferably, the resistance of resistor R1 is much greater than that of resistor R2, thus the input voltage level is reduced. The filter 14 comprises a diode D1 and a capacitor C1. An anode of the diode D1 is coupled to a junction of the resistors R1 and R2. The capacitor C1 is coupled between a cathode of the diode D1 and the ground line G. The filter 14 extracts a DC component of an input signal from the junction of the resistors R1 and R2 and passes it to the level determination circuit 16. The level determination circuit 16 then generates the first detect signal 18 according to the extracted DC component from the filter 14. The level determination circuit 16 comprises resistors R3~R6, an NPN transistor Qq, and a PNP transistor Q2. The resistors R3 and R4, coupled in series, are disposed between the cathode of the diode D1 and the ground line G, forming a voltage divider to adjust the voltage level of the extracted DC component from the filter 14. The transistor Q1 has a base coupled to a junction between the resistors R3 and R4, a collector receiving a supply voltage Vcc1 via the resistor R5 and an emitter coupled to the ground line G. The transistor Q2 has a base coupled to the collector of transistor Q1, an emitter receiving the supply voltage Vcc1 via the resistor R6, and a collector coupled to the ground line G, generating the first detect signal 18 to the comparison logic circuit 30.

The voltage detecting circuit 20 is similar to the voltage detecting circuit 10 and comprises a voltage divider 22, a filter 24, and a level determination circuit 26. The voltage divider 22 comprises resistors R7 and R8 coupled in series between the neutral line N and the ground line G to adjust the voltage level therebetween. Preferably, the resistance of resistor R7 is much greater than that of resistor R8; thus the input voltage level is reduced. The filter 24 comprises a diode D2 and a capacitor C2. An anode of the diode D2 is coupled to a junction of the resistors R7 and R8. The capacitor C2 is coupled between a cathode of the diode D2 and the ground line L. The filter 24 extracts a DC component of an input signal from the junction of the resistors R7 and R8 and passes it to the level determination circuit 26. The level determination circuit 26 then generates the detect signal 28 according to the extracted DC component from the filter 24. The level determination circuit 26 comprises resistors R9~R12, an NPN transistor Q3, and a PNP transistor Q4. The resistors R9 and R10, coupled in series, are disposed between the cathode of the diode D2 and the ground line G, forming a voltage divider to adjust the voltage level of the extracted DC component from the filter 24. The transistor Q3 has a base coupled to a junction between the resistors R9 and R10, a collector receiving a supply voltage Vcc2 via the resistor R11 and an emitter coupled to the ground line G. The transistor Q4 has a base coupled to the collector of transistor Q3, an emitter receiving the supply voltage Vcc2, and a collector via the resistor R12, coupled to the ground line G, transmitting the detect signal 28 to the comparison logic circuit 30.

The comparison logic circuit comprises a NOT gate UC, an AND gate UA and a NOR gate UB. The NOT gate UC receives the detect signal 18 at a terminal 5 thereof. The AND gate UA has an input terminal 1 coupled to an output terminal 6 of the NOT gate UC, an input terminal 2 receiving the detect signal 28, and an output terminal generating the identification signal 32. The NOR gate UB has input terminals 3 and 4 receiving the detect signals 18 and 28 respectively, and an output terminal generating the identification signal 34. The operation of the device 100 is described as follows.

If the AC power supply is a single-phase two-wire system, the hot line L, ground line G, and neutral line N of FIGS. 1 and 2 are connected to the hot line, ground line, and neutral line of the AC power supply respectively. Receiving the input from the hot line L, the voltage level thereof is reduced by the voltage divider 12 and a divided signal is provided to the filter 14. The filter 14 then extracts the DC component from the divided signal and outputs the extracted DC component to the level determination circuit 16. The voltage divider formed by the resistors R3 and R4 further adjusts the voltage level of the extracted DC component from the filter 14 and provides the adjusted DC component to the base of the transistor Q1. The transistor Q1 is turned on, turning on the transistor Q2, and the transistor Q2 transmits the first detect signal 18 having a low level to the comparison logic circuit 30. With regard to the detecting circuit 20, since the voltage divider 22 receives an input from the neutral line N, the transistor Q3 is turned off, and the detect signal 28 is pulled to high by the pull-up resistor R12. Table 1 shows possible logic combinations of the comparison logic circuit 30. It is observed that with the low level detect signal 18 and high level detect signal 28 input to the comparison logic circuit 30, the arrangment of the AC power supply is identified as single-phase two-wire system.

TABLE 1

| Input signal state UC.5/ UB.3 | Input signal state UA.2/ UB.4 | Input signal state UA.1/ UC.6 | Output signal 32 of UA UA.1 · UA.2 | Output signal 34 of UB $\overline{UB.3 + UB.4}$ | AC power supply arrangement AC power supply arrangement |
|---|---|---|---|---|---|
| 0 | 1 | 1 | 1 | 0 | 220 V or 110 V single-phase two-wire |
| 0 | 0 | 1 | 0 | 1 | 220 V single-phase three-wire |
| 1 | 0 | 0 | 0 | 0 | Inverted single-phase two-wire |

Similarly, if the AC power supply detected is a single-phase three-wire system, the hot line L, ground line G and neutral line N of FIGS. 1 and 2 are connected to the first hot line, ground line, and second hot line of the AC power supply respectively. In this way, the voltage detecting circuits 10 and 20 generate low level detect signals 18 and 28 to the comparison logic circuit 30. As shown in Table 1, after logic computation in the comparison logic circuit 30, the arrangement of the AC power supply is identified as a single-phase three-wire system.

Moreover, in the case of inverted single-phase two-wire AC power supply, that is the hot line and neutral line of a single-phase two-wire system are swapped, the voltage detecting circuits 10 and 20 generates high level detect signal 18 and low level detect signal 28 to the comparison logic circuit 30. After the logic computation of the comparison logic circuit 30, the arrangement of the AC power supply is identified as an inverted single-phase two-wire system.

Thus, if miswiring of the AC power supply occurs, it can be identified with exemplary embodiments, avoiding damage to individuals and electronic devices.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A device for identifying an arrangement of an alternating current (AC) power supply, comprising:
    a first voltage detecting circuit coupled to a ground line and a hot line of the AC power supply, receiving a first input signal from the hot line of the AC power supply for detecting a voltage level thereof to generate a first detect signal; a second voltage detecting circuit coupled to the ground line and a neutral line of the AC power supply, receiving a second input signal from the neutral line of the AC power supply and detecting a voltage level thereof to generate a second detect signal; and a comparison logic circuit coupled to the first and second voltage detecting circuits, receiving the first and second detect signals to generate first and second identification signals according to the first and second detect signals, indicating the arrangement of the AC power supply, wherein combination of low level first detect signal and high level second detect signal, low level first detect signal and low level second detect signal, and high level first detect signal and low level second detect signal indicate the arrangement of the AC power supply being single-phase two-wire, single- phase three-wire, and inverted single-phase two wire arrangements respectively.

2. The device as claimed in claim 1, wherein the first voltage detecting circuit comprises:
    a first voltage divider coupled between the hot and ground lines, receiving the first input signal and adjusting the voltage level thereof to generate a first divided signal;
    a first filter coupled to the first voltage divider, receiving the first divided signal and rectifying the first divided signal to generate a first rectified signal according to a direct current (DC) component thereof; and
    a first level determination circuit coupled to the first filter, generating the first detect signal in response to the first rectified signal.

3. The device as claimed in claim 2, wherein the first voltage divider comprises first and second resistors coupled in series, disposed between the hot and ground lines, generating the first divided signal at a junction of the first and second resistors.

4. The device as claimed in claim 2, wherein the first filter comprises a first diode having an anode receiving the first divided signal and a first capacitor having a first terminal coupled to the ground line and a second terminal coupled to a cathode of the first diode, generating the first rectified signal.

5. The device as claimed in claim 2, wherein the first level determination circuit comprises:
    a first transistor having a base receiving the first rectified signal, a collector coupled to a power source via a third resistor, and an emitter coupled to the ground line; and
    a second transistor having a base coupled to the collector of the first transistor, a collector coupled to the ground line, and an emitter coupled to the power source via a first pull-up resistor, generating the first detect signal.

6. The device as claimed in claim 5, wherein the first level determination circuit further comprises a second voltage divider comprising:
    a fourth resistor having a first terminal receiving the first rectified signal and a second terminal coupled to the base of the first transistor; and
    a fifth resistor coupled between the base of the first transistor and the ground line.

7. The device as claimed in claim 1, wherein the second voltage detecting circuit comprises:
    a third voltage divider coupled between the neutral and ground lines, receiving the second input signal and adjusting the voltage level thereof to generate a second divided signal;
    a second filter coupled to the second voltage divider, receiving the second divided signal and rectifying the second divided signal to generate a second rectified signal according to a DC component thereof; and
    a second level determination circuit coupled to the second filter, generating the second detect signal in response to the second rectified signal.

8. The device as claimed in claim 7, wherein the third voltage divider comprises sixth and seventh resistors coupled in series, disposed between the neutral and ground lines, generating the second divided signal at a junction of the sixth and seventh resistors.

9. The device as claimed in claim 7, wherein the second filter comprises a second diode having an anode receiving the second divided signal, and a second capacitor having a first terminal coupled to the ground line and a second terminal coupled to a cathode of the second diode, generating the second rectified signal.

10. The device as claimed in claim 7, wherein the second level determination circuit comprises:
    a third transistor having a base receiving the second rectified signal, a collector coupled to a power source via an eighth resistor, and an emitter coupled to the ground line; and
    a fourth transistor having a base coupled to the collector of the third transistor, a collector coupled to the ground line, and an emitter coupled to the power source via a second pull-up resistor, generating the second detect signal.

11. The device as claimed in claim 10, wherein the second level determination circuit further comprises a fourth voltage divider comprising:
    a ninth resistor having a first terminal receiving the second rectified signal and a second terminal coupled to the base of the third transistor; and a tenth resistor coupled between the base of the third transistor and the ground line.

12. The device as claimed in claim 1, wherein the comparison logic circuit comprises:
   a NOT gate coupled to the first detecting circuit, receiving the first detect signal;
   an AND gate coupled to the NOT gate and the second detecting circuit, receiving an output of the NOT gate and the second detect signal to generate the first identification signal; and
   a NOR gate coupled to the first and second detecting circuits, receiving the first and second detect signals to generate the second identification signal.

13. The device as claimed in claim 1, further comprising a processor coupled to the comparison logic circuit, receiving the first and second identification signals to determine the arrangement of the AC power supply accordingly.

14. A device for identifying an arrangement of an alternating current (AC) power supply, comprising:
   a first detecting circuit coupled between a hot line and a ground line of the AC power supply, detecting a voltage level there between to generate a first detect signal, comprising:
   a first voltage divider coupled between the hot and ground lines, receiving a first input signal from the hot line and adjusting the voltage level thereof to generate a first divided signal;
   a first resistor-capacitor (RC) filter coupled to the first voltage divider, receiving and rectifying the first divided signal to generate a first rectified signal according to a DC component thereof; and
   a first level determination circuit coupled to the first RC filter, generating the first detect signal in response to the first rectified signal;
   a second detecting circuit coupled between a neutral line and the ground line of the AC power supply, detecting a voltage level there between to generate a second detect signal, comprising:
   a second voltage divider coupled between the neutral and ground lines, receiving a second input signal from the neutral line and adjusting the voltage level thereof to generate a second divided signal;
   a second RC filter coupled to the second voltage divider, receiving and rectifying the second divided signal to generate a second rectified signal according to a DC component thereof; and
   a second level determination circuit coupled to the second RC filter, generating the second detect signal in response to the second rectified signal; and
   a comparison logic circuit receiving the first and second detect signals to generate first and second identification signals according to the first and second detect signals, indicating the arrangement of the AC power supply.

15. The device as claimed in claim 14, wherein the first level determination circuit comprises:
   a first transistor having a base coupled to the first RC filter, receiving the first rectified signal, a collector coupled to a power source via a first resistor, and an emitter coupled to the ground line; and
   a second transistor having a base coupled to the collector of the first transistor, a collector coupled to the ground line and an emitter coupled to the power source via a first pull-up resistor, generating the first detect signal.

16. The device as claimed in claim 15, wherein the first level determination circuit further comprises a third voltage divider coupled between the first RC filter and the ground line, dividing the first rectified signal and generating a third divided signal to the base of the first transistor.

17. The device as claimed in claim 14, wherein the second level determination circuit comprises:
   a third transistor having a base coupled to the second RC filter, receiving the second rectified signal, a collector coupled to a power source via a second resistor, and an emitter coupled to the ground line; and
   a fourth transistor having a base coupled to the collector of the third transistor, a collector coupled to the ground line, and an emitter coupled to the power source via a second pull-up resistor, generating the second detect signal.

18. The device as claimed in claim 17, wherein the second level determination circuit further comprises a fourth voltage divider coupled between the second RC filter and the ground line, dividing the second rectified signal and generating a fourth divided signal to the base of the third transistor.

19. The device as claimed in claim 14, wherein the comparison logic circuit comprises:
   a NOT gate coupled to the first level determination circuit, receiving the first detect signal;
   an AND gate coupled to the NOT gate and second level determination circuit, receiving an output of the NOT gate and the second detect signal to generate the first identification signal; and
   a NOR gate coupled to the first and second level determination circuits, receiving the first and second detect signals to generate the second identification signal.

20. The device as claimed in claim 14, further comprising a processor coupled to the comparison logic circuit, receiving the first and second identification signals to determine the arrangement of the AC power supply accordingly.

* * * * *